March 5, 1963  H. R. SAILORS  3,080,438
CATALYTIC ALKYLATION PROCESS
Filed Jan. 28, 1960
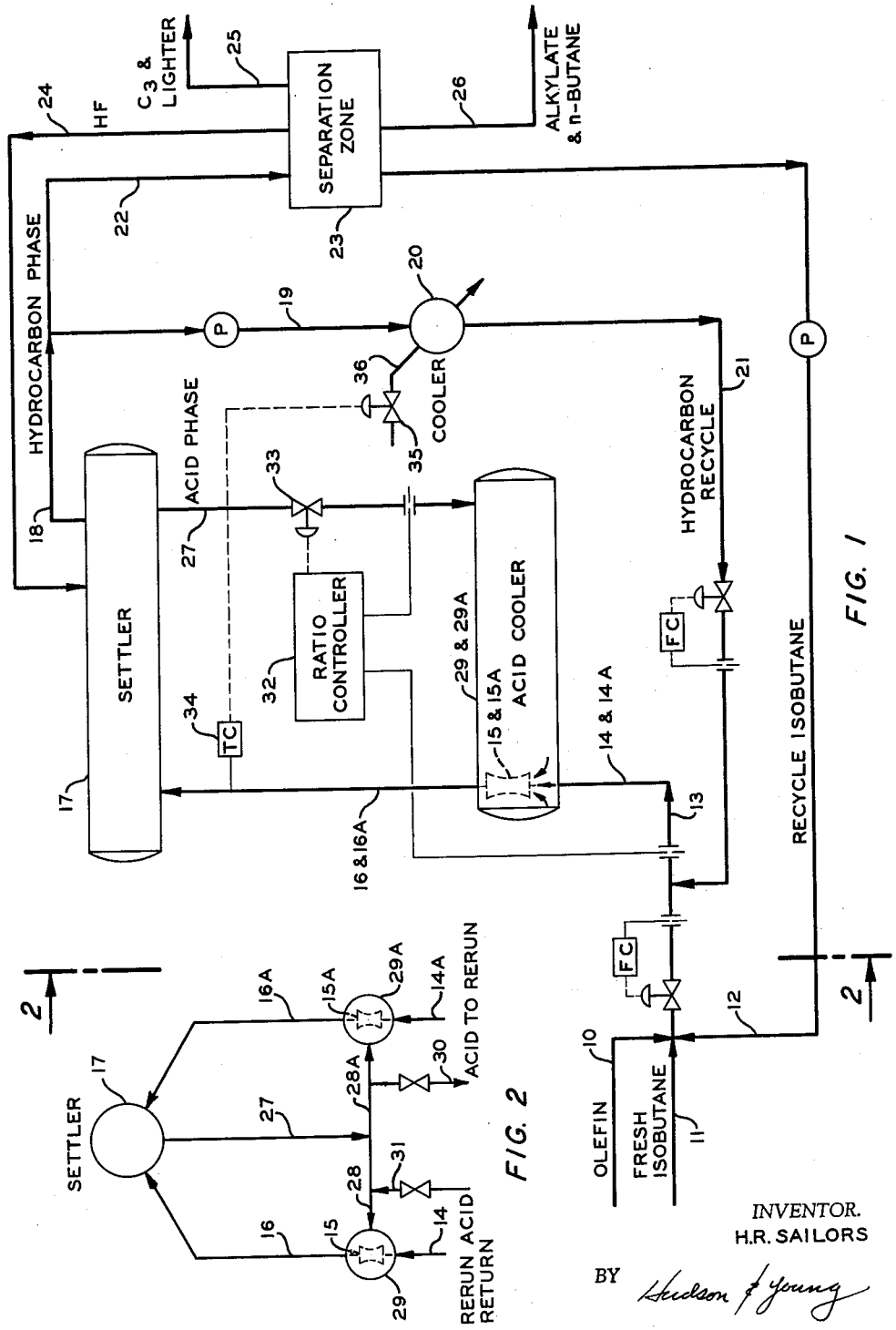
INVENTOR.
H.R. SAILORS
BY Hudson & Young
ATTORNEYS United States Patent Office 3,080,438
Patented Mar. 5, 1963

3,080,438
CATALYTIC ALKYLATION PROCESS
Howard R. Sailors, Bartlesville, Okla., assignor to Phillips Petroleum Company, a corporation of Delaware
Filed Jan. 28, 1960, Ser. No. 5,297
2 Claims. (Cl. 260—683.48)

This invention relates broadly to an improved alkylation process for the production of high quality gasoline boiling range materials. In accordance with one aspect, this invention relates to an improved process for alkylation of hydrocarbons to form high quality gasoline boiling range materials wherein a cyclic flow of liquid alkylation catalyst is provided. In accordance with another aspect, this invention relates to an improved alkylation process carried out in a circulatory system wherein hydrocarbon is in the continuous phase in the reaction zone. In accordance with still another aspect, this invention relates to an improved alkylation process carried out in a circulatory system with a liquid alkylation catalyst and wherein a large proportion of hydrocarbon is provided to absorb the heat of reaction and at the same time the isoparaffin-olefin ratio in the reaction zone is increased with increased quality of alkylate product.

One of the major problems associated with the catalytic alkylation of hydrocarbons lies in handling the alkylation catalyst, that is, transporting the catalyst through the various parts of the reaction and recovery system. The problem is particularly aggravated when acid catalyst, such as hydrofluoric acid, sulfuric acid, etc., are used since these materials in many instances are highly corrosive to ordinary materials of construction. Special equipment such as alloy valves and vessels, special pumps and pump packings are required and special safety precautions are necessary in the alkylation of hydrocarbons with acid catalysts.

It has recently been found that hydrocarbons can be alkylated in a cyclic system of liquid alkylation catalyst wherein flow of catalyst is obtained by energy imparted thereto by flowing hydrocarbons and density difference in the system. In this system, the liquid catalyst phase recovered from the alkylation effluent is cooled and then returned to the reaction zone. In this system the cooled catalyst phase is used not only as a catalyst but also to remove a portion of the heat of reaction in the alkylation zone. In order to remove adequately the heat of reaction in the above system, it is necessary to increase the catalyst phase circulation rate to the point where alkylate quality suffers. The present invention relates to an improved operation of the above process wherein a portion of the heat load is shifted from the circulating catalyst phase to a recycled hydrocarbon phase wherein the hydrocarbon phase not only assists in cooling the alkylation zone but also converts the process from a reaction in which the acid is the continuous phase to a process in which the hydrocarbon is the continuous phase.

Accordingly, an object of this invention is to provide an improved process for carrying out an alkylation in a circulatory system.

Another object of this invention is to provide an improved alkylation process carried out in a circulatory system wherein alkylate quality is improved.

In another object this invention relates to an improvement in the removal of the heat of reaction in an alkylation process in which cyclic flow of alkylation catalyst is provided.

Other aspects, objects, as well as the several advantages will become apparent upon a study of the disclosure, drawing and appended claims.

In accordance with the present invention, in an alkylation process in which cyclic flow of liquid catalyst is provided I utilize a relatively large proportion of the hydrocarbon phase of the alkylation effluent recovered from the alkylation process to absorb a substantial portion of the heat of reaction in the alkylation zone, thereby reducing the heat exchange necessary with the recycled acid catalyst stream and at the same time increasing the isoparaffin to olefin ratio in the alkylation zone with increased quality of alkylate product.

Specifically, I divide the hydrocarbon phase of the alkylation zone effluent stream recovered from an alkylation process having cyclic flow of liquid alkylation catalyst, pass a portion of the hydrocarbon effluent directly to separation, cool the remainder and mix the cooled portion with fresh olefin, fresh and recycled isoparaffin, and then pass the total hydrocarbon mixture at high velocity through a mixing zone where in it is contacted with cooled recycled liquid alkylation catalyst.

The total amount of hydrocarbon contacted with the acid catalyst introduced into the reaction zone will be sufficient to maintain hydrocarbon as the continuous phase. Thus, the amount of acid catalyst in the reaction zone will be in a minor volume proportion based on the total alkylation zone reaction mixture. Generally, the amount of acid in the reaction zone will be less than 50 volume percent and above about 25 volume percent.

In general, any of the conventional catalytic alkylation reactions can be carried out by the process of the present invention. Thus, the alkylation reaction can comprise reaction of an isoparaffin with an olefin, or reaction of an aromatic hydrocarbon with an olefin or other alkylating agent, the reaction in each instance being carried out in the presence of a suitable alkylation catalyst. In place of an olefin as an alkylating agent, various alcohols and ethers, such as isopropyl alcohol, tert-butyl alcohol, secondary butyl alcohol, isopropyl ether, and the like, can be carried out in the presence of a suitable alkylation catalyst. Likewise, the corresponding alkyl esters, such as the alkyl halides, sulfates, phosphates, fluorides of the olefins, may be used as the alkylation agent with an appropriate or compatible alkylation catalyst.

The alkylation reaction is carried out with the hydrocarbon reactants in the liquid phase; however, the reactants need not be normally liquid hydrocarbons. The reaction conditions can vary in temperature from sub-zero temperatures to temperatures as high as 200° F., and can be carried out at pressures varying from atmospheric to as high as 1,000 p.s.i., and higher, and space velocities ranging from about 0.1 to about 20. A variety of alkylation catalysts can be employed in the alkylation reaction, including the well-known catalysts, such as sulfuric acid, hydrofluoric acid, phosphoric acid, metal halides, such as aluminum chloride, bromide, etc., or other liquid alkylation catalyst; however, hydrofluoric acid is preferred.

While generally applicable to the alkylation of hydrocarbons, the present invention is particularly effective for alkylation using low boiling olefins such as propylene, butenes, pentenes, etc., and saturated branched chained paraffins, such as isobutane, in the presence of hydrofluoric acid. In the alkylation of isoparaffins with olefins, a substantial molar excess of isoparaffin over olefin is employed, generally to provide an external feed ratio in excess of 1:1, usually from about 4:1 to about 20:1, and preferably about 5:1 to 15:1. The external ratio is the mol ratio of fresh isobutane plus recycle isobutane to olefin. The overall ratio is the mol ratio of fresh isoparaffin plus recycled isoparaffin from fractionation and hydrocarbon phase recycle to olefin. This ratio generally will be of the order of 50:1, preferably at least 80:1. The reaction zone is maintained under sufficient pressure to insure that the hydrocarbon reactants and alkylation catalyst are in the liquid phase. The temperature of the reaction will vary with the reactants and with the catalyst employed, but generally ranges from about −40° F. to about 150° F., preferably from 70° F. to 120° F.

A better understanding of the invention will be obtained upon reference to the accompanying drawings of which:

FIGURE 1 is a diagrammatic illustration of a vertical alkylation reactor, an effluent settler and alkylation catalyst cooler provided in an arrangement suitable for carrying out the invention;

FIGURE 2 is an end elevation of the apparatus arrangement of FIGURE 1.

Referring now to the drawings, 16 and 16A are upwardly extending elongated tubular reactors which are in open communication at the top with one end of a horizontally disposed elongated settler surge vessel 17. Although two elongated reactors are shown in the drawing, any number of reactors can be used in the practice of the invention. At one end of the settler or surge vessel an outlet conduit 18 is provided for the removal of separated hydrocarbon. A bottom outlet conduit 27 is provided at the same end of settler 17 as outlet 18 for withdrawal of liquid catalyst for recycle. Conduit 27 is connected at its lower end with coolers 29 and 29A through conduits 28 and 28A, respectively. Although two coolers are shown in the drawing, one or more coolers are contemplated in the invention.

The lower ends of tubular reactors 16 and 16A are in open communication with coolers 29 and 29A, respectively, at the ends of the coolers opposite from the connections with conduits 28 and 28A. Hydrocarbon feed conduits 14 and 14A are provided in coolers 29 and 29A, respectively, passing through the bottoms of said coolers and in alignment with reactors 16 and 16A, respectively, and terminating as openings communicating with jet mixers or similar comingling devices 15 and 15A adjacent to the discharge end of lines 14 and 14A, respectively. The lower ends of reactors 16 and 16A communicate with the discharge of mixers 15 and 15A, respectively. Ratio controller 32, which senses and compares the flows in conduits 13 and 27, regulates the flow in conduit 27 by way of control valve 33. Temperature controller 34 senses the temperature in the reactors and regulates the flow of coolant passed through control valve 35, conduit 36 and cooler 20 responsive thereto.

In actual operation, a liquid hydrocarbon feed material comprising an alkylating agent, such as a low boiling olefin, e.g. butylene, introduced by conduit 10, and an alkylatable hydrocarbon, such as a low boiling isoparaffin, e.g. isobutane, introduced by conduits 11 and 12 are admixed in conduit 13. The admixture of olefin and isobutane in conduit 13 is mixed with recycled hydrocarbon from the alkylation effluent introduced by conduit 21, and the total hydrocarbon phase is passed by way of conduits 13, 14, and 14a at a high velocity into the inlet end of mixers 15 and 15a, respectively. Cooled liquid alkylation catalyst, for example, hydrofluoric acid, is picked up in mixers 15 and 15a by the high velocity flow of hydrocarbon. The hydrocarbon mixture containing a minor proportion of catalyst is introduced into the lower end of vertical tubular reactors 16 and 16a.

The hydrocarbon present in the alkylation system exceeds in volume the amount of catalyst and therefore constitutes the continuous phase in the reaction zone. Hydrocarbon and acid catalyst pass upwardly through reactors 16 and 16a in co-current flow. The simultaneous upward movement of acid and hydrocarbon results from a combination of (1) the kinetic energy of the hydrocarbon feed, and (2) the difference in density of the hydrocarbon-acid mixture in reactors 16 and 16a as compared to the acid phase in conduit 27.

As the acid catalyst and hydrocarbon reactants come in contact reaction between the olefin and isoparaffin occurs, with the formation of higher molecular weight materials of increased octane value. The reaction being exothermic, the temperature of the acid and reactants increases as the reaction mixture passes upwardly through reactors 16 and 16a. Within a very short period of time, generally of the order of 1–30 seconds, the alkylation reaction is completed, after which the reaction effluent containing hydrocarbon product (alkylate), acid catalyst and unreacted feed hydrocarbons passes from the reactors, and enters one end of settler 17. Within settler 17, the effluent from reactors 16 and 16a separates into an acid phase and a hydrocarbon phase.

Separation of the alkylation reaction effluent into acid and hydrocarbon phases, which commences with introduction of the reaction effluent to the settler vessel 17, is substantially completed by the time the effluent reaches the opposite end of the vessel. This vessel is preferably operated liquid full by the use of elevated pressures, but it can be operated with both liquid and gas phases at lower pressures, with provision being made to vent excess gas. The lower phase or acid phase is withdrawn from settler 17 through conduit 27 and is divided into substantially equal quantities in conduits 28 and 28a, through which it is introduced into coolers 29 and 29a, respectively. The acid passed through the coolers is reduced in temperature, but due to its low specific heat and the amount circulated only a portion of the heat of reaction is removed by the acid alkylation reactors. As necessary, acid can be withdrawn from the system through valved conduit 30 for rerunning and the rerun acid (or fresh acid) can be returned to the system through valved conduit 31.

The upper phase or hydrocarbon phase in settler 17 is withdrawn through conduit 18 and a portion of this stream is passed directly to a separation zone 23 by way of conduit 22. Separation zone 23 can comprise fractional distillation, or other well known separations, for the separation of the hydrocarbon phase effluent from the alkylation system. Hydrofluoric acid recovered from separation zone 23 is returned to settler 17 by way of conduit 24. Propane and lighter hydrocarbon materials are recovered and removed from the process by way of conduit 25. An alkylate and normal butane-containing stream is removed for other separation, if desired, by way of conduit 26. Isobutane for recycle is returned to the alkylation reactor by way of conduit 12.

In accordance with the present invention, a portion of the hydrocarbon phase recovered from settler 17 is pumped by way of conduit 19 through cooler 20 and conduit 21 and returned to the reactors to remove the remaining portion of the heat of reaction in the reactors. Hydrocarbon passed through cooler 20 is reduced in temperature sufficiently to remove heat picked up during the alkylation reaction. As noted previously, a sufficient amount of the hydrocarbon phase is cooled and returned to the reaction zones along with isobutane to maintain hydrocarbon as a continuous phase in the reaction zone. The hydrocarbon to acid ratio to be maintained in reactors 16 and 16a is set on ratio controller 32 which regulates the flow of recycled acid phase to the reactor by control valve 33 to maintain the set ratio.

Thus, in accordance with the present invention, I utilize a large proportion of the hydrocarbon product to absorb the heat of reaction which reduces the heat exchange necessary with the recycled acid stream, and at the same time provides a reduction in the acid to hydrocarbon ratio, thereby improving the quality of the alkylate product. My process shifts a portion of the heat load from the circulating acid stream to the recycled hydrocarbon stream. Recycling alkylate to the reaction zone not only aids in cooling this zone, but also converts the process from a reaction in which acid is in the continuous phase to a process in which the hydrocarbon is in a continuous phase.

This invention is further illustrated by the following specific example. However, it is to be understood that this is given by way of explanation and the invention is not limited thereto.

*Example*

In comparison runs, charging the same quantity and quality of olefin, fresh isobutane, and recycle isobutane, in the prior art to maintain reaction temperature of 97.5° F. an HF acid/hydrocarbon volume ratio of 6:1 is necessary; the RON with 3 cc. TEL is 101.8; in my invention to maintain the reaction temperature of 97.5° F. I recycle a portion of the hydrocarbon effluent resulting in HF acid/hydrocarbon volume ratio of 0.92:1; the RON with 3 cc. TEL is 105.1. The same quantity of alkylate is made in both operations.

Obviously many modifications and variations of the invention, as hereinbefore set forth, can be made without departing from the spirit and scope thereof, and, therefore, only such limitations should be imposed as are indicated in the appended claims.

I claim:

1. An improved process for carrying out an alkylation reaction in a circulatory system wherein hydrocarbon is in the continuous phase in the reaction zone and the flow of liquid hydrofluoric acid alkylation catalyst through said system is obtained by energy imparted thereto by flowing hydrocarbons and density differential in said system, which comprises introducing a major proportion of a liquid hydrocarbon mixture containing alkylatable hydrocarbon and alkylating agent at a high velocity at a first measured rate into a lower portion of an upwardly extending reaction zone along with a desired minor proportion of said catalyst at a second measured rate, maintaining alkylation conditions of temperature and residence time in said alkylation reaction zone, removing alkylation reaction effluent from an upper portion of said reaction zone and passing same to a settling zone to obtain a catalyst phase and a hydrocarbon phase flowing said catalyst phase at a rate controlled in response to said first and second measured rates and effective to maintain the desired ratio of hydrocarbon to catalyst in said reaction zone through a cooling zone which is insufficient of itself to maintain the desired reaction temperature and then into the lower portion of said reaction zone, measuring the temperature of the mixture of hydrocarbons and catalyst introduced into said reaction zone and producing a signal proportional to said measuring, and cooling a portion of said hydrocarbon phase in response to said signal and recycling same to said reaction zone in a quantity sufficient to maintain a desired reaction temperature.

2. Process according to claim 1 wherein said alkylating agent is an olefin and said alkylatable hydrocarbon is an isoparaffin.

References Cited in the file of this patent

UNITED STATES PATENTS

| | | |
|---|---|---|
| 2,359,119 | Karr et al. | Sept. 26, 1944 |
| 2,386,681 | Hadden | Oct. 9, 1945 |
| 2,433,944 | Draeger et al. | Jan. 6, 1948 |
| 2,435,028 | Bradley | Jan. 27, 1948 |
| 2,435,029 | Bradley | Jan. 27, 1948 |
| 2,701,184 | Rupp | Feb. 1, 1955 |
| 2,850,552 | Ogle | Sept. 2, 1958 |

OTHER REFERENCES

Phillips Petroleum Company, "Hydrofluoric Acid Alkylation" (1946), pp. 3–7.